United States Patent [19]
Driver

[11] Patent Number: 5,605,514
[45] Date of Patent: Feb. 25, 1997

[54] AUTOMATIC TRANSMISSION SYSTEM FOR A CYCLE

[76] Inventor: Gary W. Driver, 101 Holcombe St., Shepherd, Tex. 77371

[21] Appl. No.: 517,434

[22] Filed: Aug. 21, 1995

[51] Int. Cl.$^6$ ........................................... F16H 9/00
[52] U.S. Cl. .............................. 474/70; 280/236; 280/260
[58] Field of Search ....................... 474/69, 70; 280/236, 280/259, 260

[56] References Cited

U.S. PATENT DOCUMENTS

| | | | |
|---|---|---|---|
| 4,546,990 | 10/1985 | Harriger | 280/259 X |
| 4,684,143 | 8/1987 | Sato | 280/260 X |
| 4,795,014 | 1/1989 | Rheingold | 280/200 X |
| 5,121,936 | 6/1992 | Cowan | 280/236 |
| 5,199,929 | 4/1993 | Stites | 474/70 X |
| 5,215,323 | 6/1993 | Cowan | 280/236 |

Primary Examiner—Roger J. Schoeppel
Attorney, Agent, or Firm—Harrison & Egbert

[57] ABSTRACT

An automatic transmission system for a cycle including a belt member having a fixed width and extending from a first pulley connected to the pedals of the cycle to a second pulley in driving connection to a wheel of the cycle and an actuator contacting the belt member. The second pulley has a belt-receiving slot of tapering width such that the slot is widest adjacent an outer diameter of the second pulley. The actuator applies the pressure to the belt member in relation to a rate of rotation of the wheel. The actuator causes the belt member to move radially in the tapered slot. The actuator includes an arm member which extends outwardly from the actuator and is in interactive contact with the belt member. The second pulley includes a first pulley half, a second pulley half, and a spindle connecting the first pulley half to the second pulley half. The first pulley half is in resilient relationship to the second pulley half. The actuator includes a pump drivedly connected to the wheel and a conduit extending from the pump to the actuator.

18 Claims, 6 Drawing Sheets

FIG. 6

AUTOMATIC TRANSMISSION SYSTEM FOR A CYCLE

TECHNICAL FIELD

The present invention relates to transmission systems for bicycles. More particularly, the present invention relates to automatic transmission systems which are responsive to the speed of the cycle. Additionally, the present invention relates to belt-driven bicycle transmission systems.

BACKGROUND ART

The conventional multiple speed bicycle employs derailleurs to manually move the drive chain from one size diameter sprocket to another size diameter sprocket, either on the drive sprockets or the sprockets on the driven wheel. The objective of this system is to progressively change the gear ratio to match the speed of the vehicle as it increases. Whenever such a system is used on bicycles, it improves the efficiency of the pumping of the pedals. In order to accomplish this task, the rider starts in the low gear ratio with the drive chain on the smallest driver sprocket and on the largest driven sprocket. As speed is increased, the gear is changed to the next highest gear by manually changing the driven gear via the derailleur mechanism. The next highest gear ratio is obtained by changing the driver sprocket from the smaller to the larger. The next highest gear ratio is obtained by first lowering the driver sprocket and also increasing the driven sprocket to the next size gear. The next highest gear ratio is obtained by changing the driver sprocket back to the larger. The next highest gear ratio is obtained by changing the driver sprocket from the larger to the smaller and also increasing the driven sprocket to the next size gear. In the case of a ten-speed bicycle, this process continues in the above described pattern until the tenth gear ratio is obtained. To obtain a smooth operation when the speed decreases, the above process has to be reversed.

It is an object of the present invention to provide an automatic transmission system for a cycle which automatically changes the gear ratio as the speed of the bicycle increases or decreases.

It is a further object of the present invention to provide an automatic transmission system for a bicycle which has continuously variable gear ratios.

It is a further object of the present invention to provide an automatic transmission system for a bicycle that improves the efficiency of pedalling.

It is still another object of the present invention to provide an automatic transmission system for a bicycle which is relatively inexpensive, easy to use, and easy to implement.

These and other objects and advantages of the present invention will become apparent from a reading of the attached specification and appended claims.

SUMMARY OF THE INVENTION

The present invention is an automatic transmission system for a cycle that includes a belt member having a fixed width and extending from a first pulley connected to the pedals of the cycle to a second pulley in driving connection to a wheel of the cycle, and an actuator means which contacts the belt member so as to apply a pressure to the belt member in relation to a rate of rotation of the wheel. The second pulley of the cycle has a belt-receiving slot of tapering width such that the slot is widest adjacent an outer diameter of the second pulley. The actuator means contacts the belt member so as to move the belt member radially within this belt-receiving slot.

Specifically, the actuator means of the present invention includes an actuator which is affixed to the frame of the cycle and is driven by the wheel of the cycle. An arm member extends outwardly from the actuator and is in interactive contact with the belt member. In one embodiment of the present invention, the actuator is a pneumatic actuator having a pump driven by the wheel. The arm member includes a piston arm which extends outwardly from the actuator so as to move relative to the rate of rotation of the wheel, and a control arm which is pivotally connected at one end to a frame of the cycle and contacts the belt member at an opposite end. The control arm has a freely rotatable roller in rolling contact with a surface of the belt member.

In the present invention, the second pulley includes a first pulley half, a second pulley half, and a spindle connecting the first pulley half and the second pulley half. The first pulley half is in resilient relationship to the second pulley half on the spindle. The belt member is received between the first pulley half and the second pulley half. A spring is mounted on one of the first and second pulley halves so as to urge these pulley halves toward each other. The belt member urges the first and second pulley halves away from one another as the belt moves radially inwardly of the second pulley.

In the present invention, the actuator includes a pump which is drivingly connected to the wheel, and a conduit which extends from the pump to the actuator. The arm member is longitudinally movable relative to a fluid pressure passing from the pump to the actuator. The actuator includes a bleed valve affixed thereto. This bleed valve serves to pass fluid from the actuator when the fluid pressure exceeds a predetermined level. In the embodiment of the present invention in which the actuator is a hydraulic actuator, the bleed valve serves to pass hydraulic pressure in a closed loop to the pump. A pressure control lever can be connected to the bleed valve so as to selectively choose the predetermined level of fluid pressure.

In another embodiment of the present invention, the first pulley includes an interior slot of tapering width. The belt member extends across this tapering width of the first pulley. The interior slot has a greatest width adjacent an outer diameter of the first pulley. The first pulley includes a first pulley half, a second pulley half, and a spindle connecting the first pulley half to the second pulley half. The first pulley half is in resilient relationship to the second pulley half. A spring is mounted on the spindle so as to urge the first and second pulley halves away from each other. In this embodiment of the present invention, the actuator arm includes a piston arm extending outwardly of the actuator, a pivot arm connected at one end to the piston arm, and an abutment arm connected to the pivot arm. The abutment arm has an end in abutment with a surface of one of the first and second pulley halves. A guide member is affixed to the frame and slidingly receives the abutment arm therein. The abutment arm is slidable through the guide member relative to a pivotable movement of the pivot arm. A wheel member is rotatably mounted to an end of the abutment arm. The wheel member is in rolling contact with a surface of one of the first and second pulley halves.

The system of the present invention provides a continuously variable gear ratio between the highest and lowest of the sized pulleys deployed in the system. The range of the gear ratios of the system can be adjusted to match desired ratios for competition and sport. The great advantage of the present invention is the fact that it is automatic. The rider does not have to know where he last shifted and what combination he needs in order to obtain the optimal gear ratio for the speed at which he is traveling.

The system also allows for adjustment for different rider characteristics and desires. The bleed mechanism allows the system to change the entire range of the shifting speeds. An adjustment of the bleed port can allow more air to be exhausted or fluid to bypass back to the pump. The more the bleed port is opened, the more speed is needed to turn the compressor/pump so as to produce enough pressure to move the actuators to a given gear ratio. This, in essence, forces the gear ratio in a lower range up to a higher speed. To decease the adjustable bleed port opening allows the compressor/pump to build up pressure at a lower speed. This produces a higher gear ratio at a lower relative speed. The bleed port also allows the actuators to return to the lower gear ratios as the speed decreases. When the vehicle comes to a complete stop the gear ratio will be at its lowest.

In the present application, the term "cycle" is employed so as to encompass a variety of vehicles. For example, the term "cycle" can be applied to bicycles, tricycles, recumbent bicycles, or a variety of other vehicles in which a wheel is driven by force applied to another pulley.

DETAILED DESCRIPTION OF THE INVENTION

Figure 1:
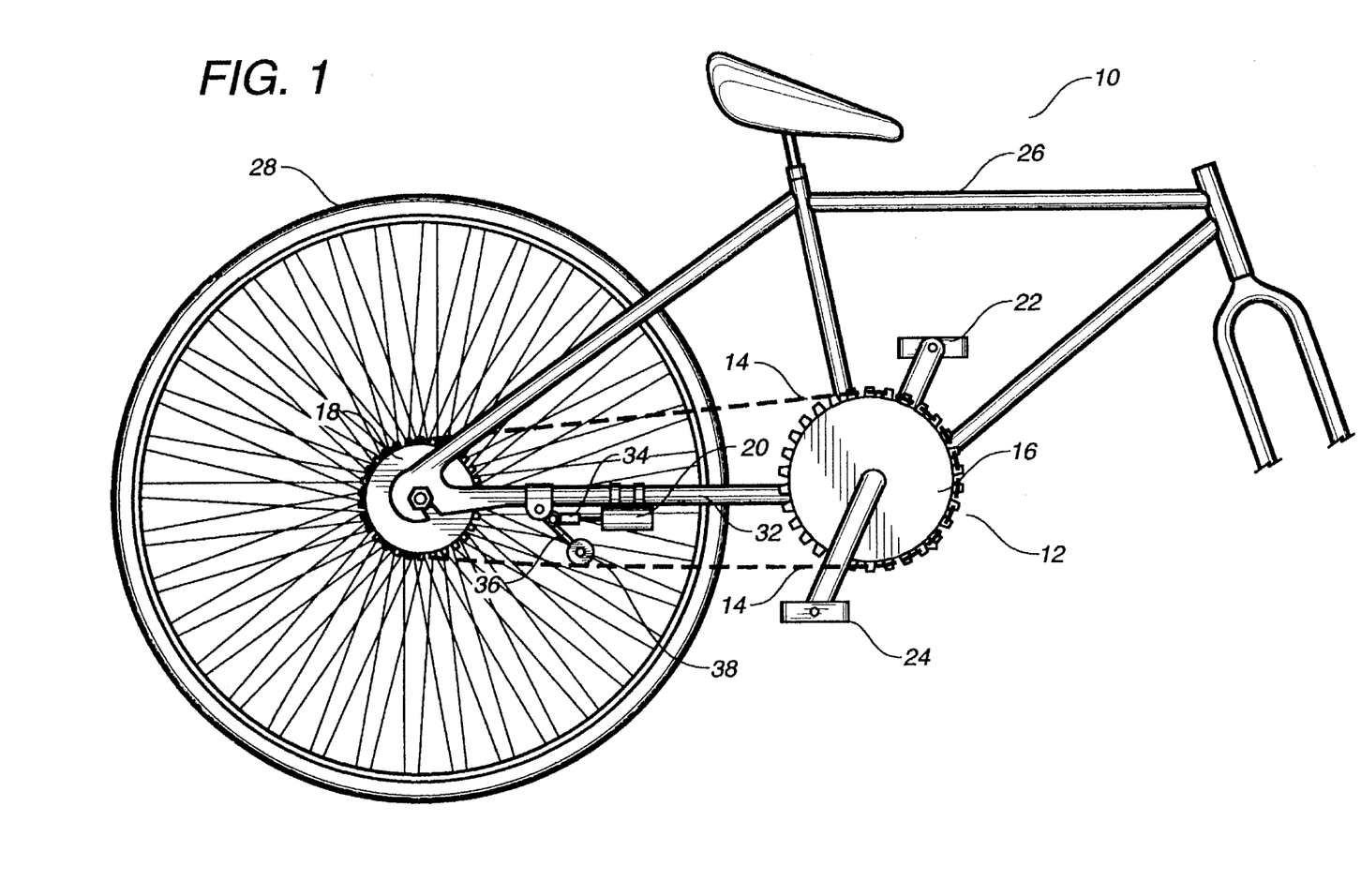
FIG. 1 is a side elevational view of a bicycle employing the automatic transmission system of the present invention.

Referring to FIG. 1, there is shown at 10 a bicycle employing the automatic transmission system 12 of the present invention. The automatic transmission system of the present invention includes a belt 14, a first pulley 16, a second pulley 18, and an actuator 20. The belt member 14 of the present invention has a fixed width. As can be seen, the belt member 14 extends from the first pulley 16 to the second pulley 18. The first pulley 16 is connected to the pedals 22 and 24 of the bicycle 10. The first pulley 16 is supported on the frame 26 of the bicycle 10. The rear pulley 28 is mounted about the rear axle of the rear wheel 28 of the bicycle 10. As will be described hereinafter, the second pulley 18 includes a belt-receiving slot of tapering width such that the slot is widest at the outer diameter of the second pulley 18.

As can be seen in FIG. 1, the actuator 20 is mounted to strut 32 of frame 26 of bicycle 10. The actuator 20 is either hydraulically or pneumatically operated. As will be described hereinafter, a pump is connected to a gear on the rear wheel 28 of bicycle 10 so as to provide either pneumatic or hydraulic power to the actuator 20. A piston arm 34 extends outwardly of the actuator 20. The piston arm 34 is pivotally connected to a control arm 36. The control arm 36 is pivotally connected to the strut 32 of the frame 26 and applies a pressure to a surface of the belt member 14. A roller 38 is rotatably mounted to an end of the control arm 36 so as to rotate freely during the movement of the belt member 14. Whenever an actuation pressure is applied by the actuator 20 to the piston arm 34, the control arm 36 will move toward a position transverse to the strut 32. This will apply a pressure to a surface of the belt member 14 and increase the pressure of the belt acting upon the second pulley 18 at the rear wheel 28.

In FIG. 1, it should be noted that an additional actuator mechanism can be applied in conjunction with the first pulley 16 so as to provide an automatic transmission system to the first pulley 16.

Figure 2:
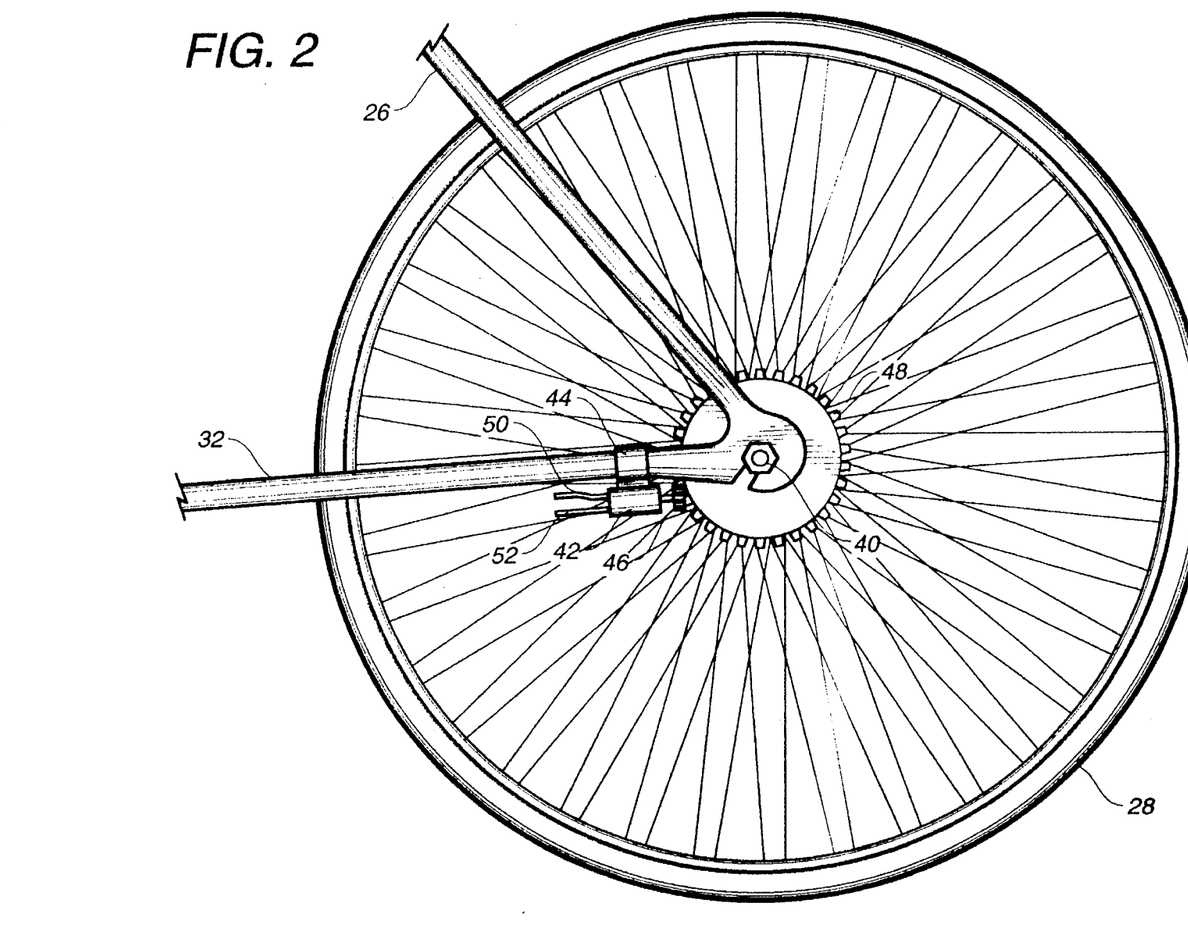
FIG. 2 is a side elevational view showing the configuration of the pump as powered by a gear on the rear wheel of the bicycle.

In FIG. 2, it can be seen that the frame 26 of the bicycle 10 extends downwardly, in a conventional fashion, so as to be secured to the axle 40 of the rear wheel 28. The strut 32 also extends to the rear wheel 28 in a conventional fashion. Importantly, a pump 42 is mounted by a bracket 44 to the strut 32. A sprocket 46 extends outwardly of the pump 42 and engages the teeth of a gear 48 on the axle 40 of the rear wheel 28. As the rear wheel 28 rotates, the gear 48 will cause the sprocket 46 to rotate. The rotation of the sprocket 46 will create the necessary "pumping" action of the pump 42. A first conduit 50 extends outwardly of the pump 42 and will transmit either air or hydraulic pressure to the actuator 20. A return line 52 is illustrated in FIG. 2. This return line 52 can either be an opening so as to allow pneumatic pressure to enter the pump 42 or to allow for hydraulic pressure to return from the actuator 20, depending on whether the system is hydraulic or pneumatic.

Figures 3, 4:
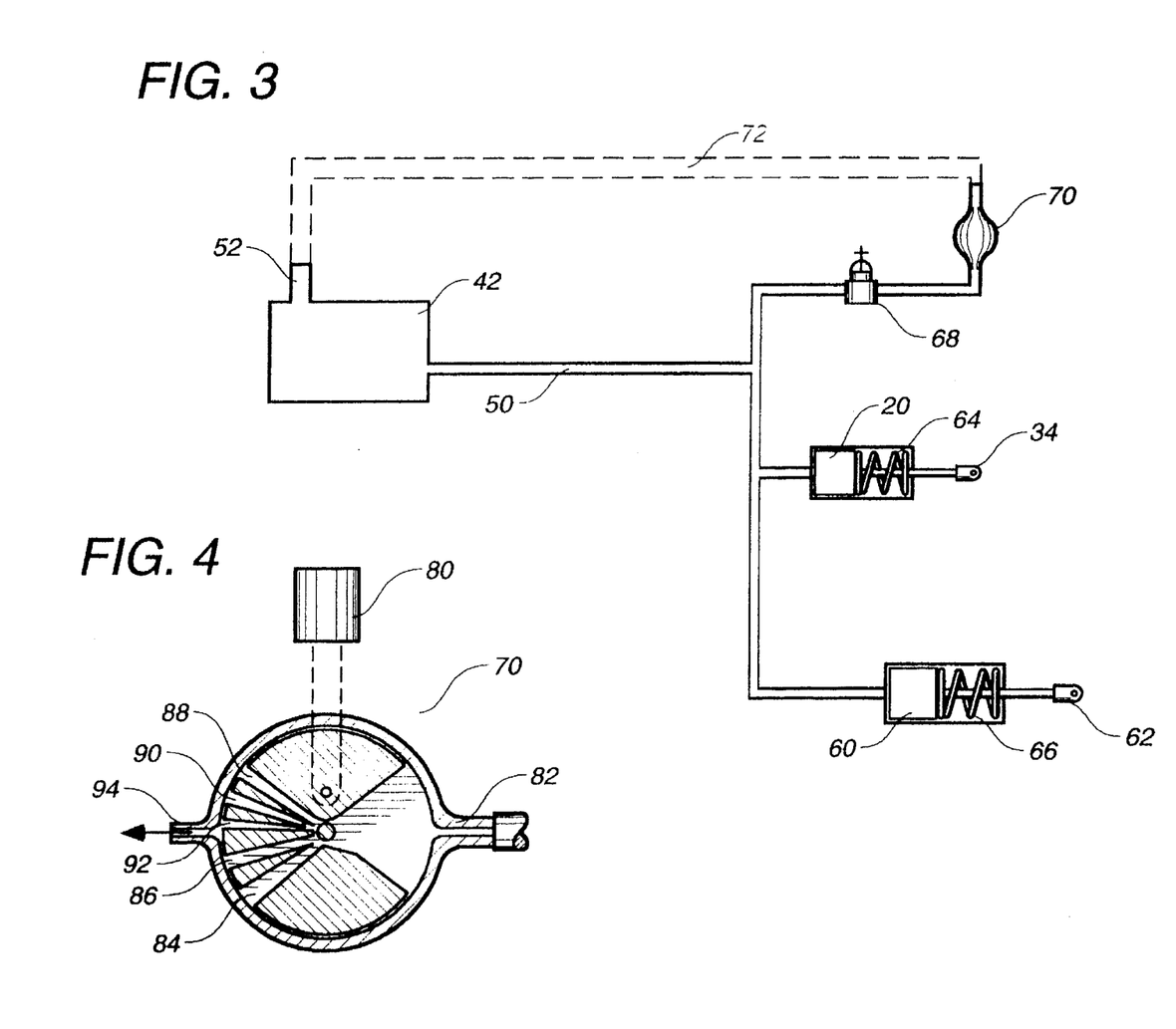
FIG. 3 is a schematic representation of the fluid system of the present invention.
FIG. 4 is a cross-sectional view of the pressure control lever of the present invention.

The characteristics of the fluid system of the present invention are illustrated in greater detail in FIG. 3. Initially, in FIG. 3, it can be seen that the pump 42 has line 50 extending through the first actuator 20. If necessary, a second actuator 60 can be employed on the first pulley 16. The fluid pressure through the conduit 50 serves to provide the necessary "actuating" power to the actuator 20 and to the actuator 60. The actuator 20 is shown as having the piston arm 34 extending outwardly therefrom. A piston arm 62 is illustrated as extending outwardly of the actuator 60. A spring 64 is employed on the interior of actuator 20 so as to be resistive of the outward movement of the piston arm 34. Similarly, a spring 66 is employed in the actuator 60 so as to be resistive of the outward movement of the piston arm 62. The details of the actuators are described in greater detail with respect to FIG. 8.

Importantly, in the present invention, a bleed valve 68 is provided on the conduit 50. The bleed valve 68 allows the escape of fluid pressures where the fluid pressures exceed a predetermined level. A variety of orifices 70 are provided at the outlet port of the conduit 50. The orifices 70 can be selected so as to adjust the release pressure of the bleed valve 68. In FIG. 3, a return line 72 is illustrated as extending from the orifices 70 in the event that the working fluid is a liquid. The liquid will return through the orifices 70, through the line 72 and back to the inlet 52 of the pump 42. If the working fluid is air, then the outlet port of the orifices 70 can emit the air to the atmosphere.

The configuration of the orifices 70 and the pressure control lever 80 are illustrated with greater particularity in FIG. 4. Initially, air passes into the inlet 82 of the orifices 70, the air will be available to pass into a plurality of lines 84, 86, 88, 90, and 92. Each of the orifices 84, 86, 88, 90, and 92 are of varying diameters. The outlet port 94 allows the fluid to pass from the inlet 82 outwardly from the orifices 70. The control lever 80 can be moved in one direction or another so as to select one of the orifices 84, 86, 88, 90, and 92 for use. Where greater pressures are desired for the operation of the actuators 20 and 60, the smallest diameter line can be chosen. When lesser pressures are desired, then larger diameter lines can be chosen. As such, the present invention can be adaptable for various requirements of the users, as described previously under the "SUMMARY OF THE INVENTION" herein.

Figure 5:
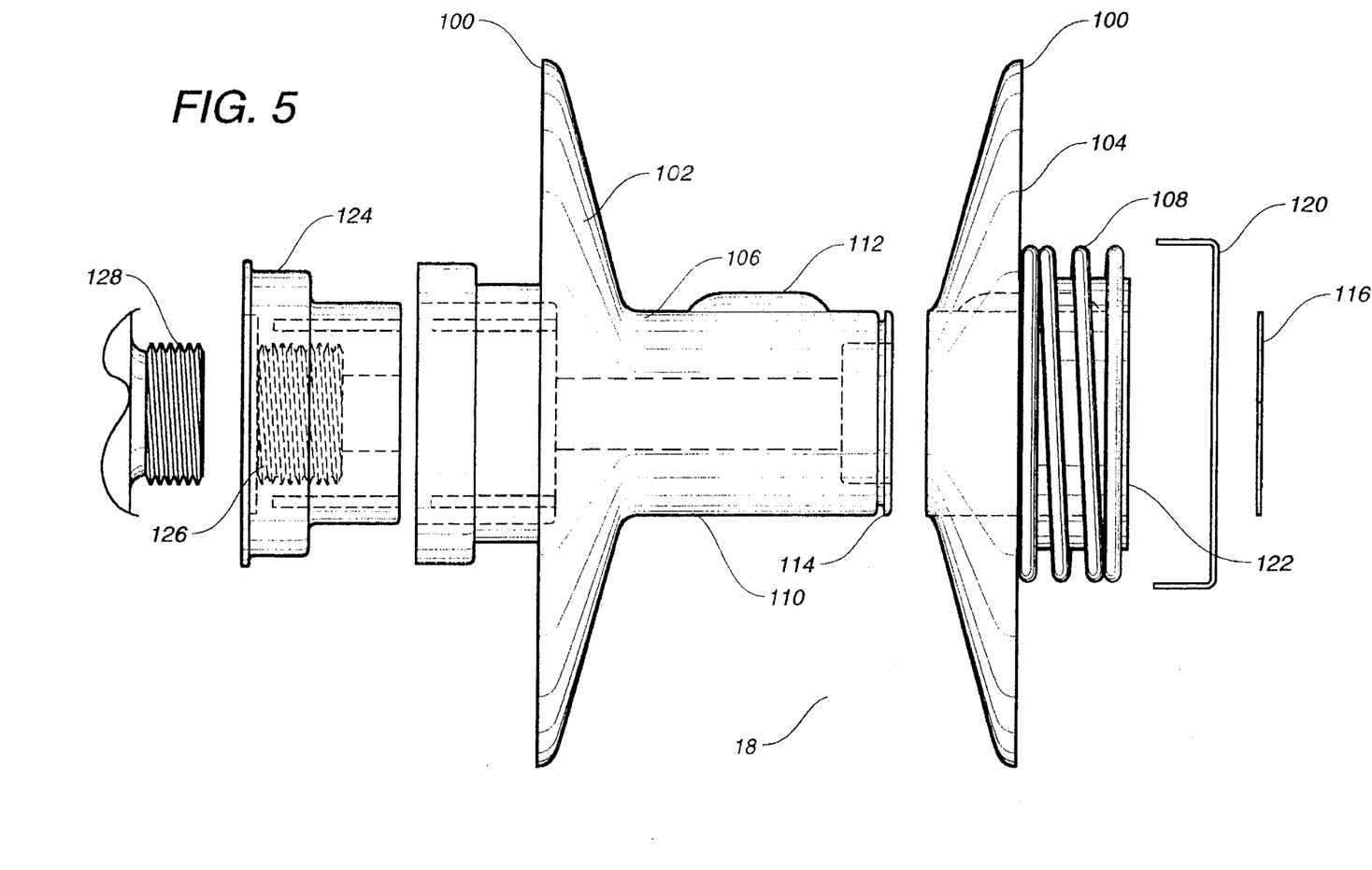
FIG. 5 is an exploded view of the second pulley as used in the automatic transmission system of the present invention.

FIG. 5 illustrates, in an exploded fashion, the structure of the second pulley 18. The second pulley 18 includes a belt-receiving slot of tapering width such that the slot is widest at the outer diameter 100 of the pulley 18. It can be seen that the second pulley 18 includes a first pulley half 102 and a second pulley half 104. A spindle 106 connects the first pulley half 102 to the second pulley half 104. A spring 108 is mounted on the second pulley half 104 so as to urge the first and second pulley halves toward each other. In FIG. 5, it can be seen that the second pulley half 104 is slidable over the outer diameter 110 of the spindle 106. A locking insert 112 is provided on this outer diameter 110 so as to secure the second pulley half 104 to the spindle 106. A locking member 114 is provided at the end of the spindle 106. An attachment ring 116 will extend around the groove of the locking member 114. A bracket member 120 will extend around the springs 108 and be interposed between the attachment ring 116 and the end 122 of the second pulley half. A connector 124 is secured to the interior of the spindle 106 and the first pulley half 102. The connector 124 includes internal threads 126 that can be threadedly received upon the external threads 128 of a conventional bicycle rear axle mounting bracket. The pulley also includes a conventional ratcheting mechanism so as to facilitate coasting. As such, the wheels will "free-wheel" when no pressure is applied to the pedals.

In normal use, the belt member 14 will extend between the inside surfaces of the first pulley half 102 and the second pulley half 104. As pressure is increased to the belt member 14, the belt member 14 will impart a pressure upon the tapered surfaces of the first and second pulley halves. This will cause the belt member 14 to move inwardly toward the spindle 106. The spring 108 will resiliently resist this movement of the pulley halves 102 and 104. By proper adjustment of the system, sufficient pressure can be applied by the actuator to the belt member 14 so as to overcome the resistance caused by the spring 108.

Figure 6:
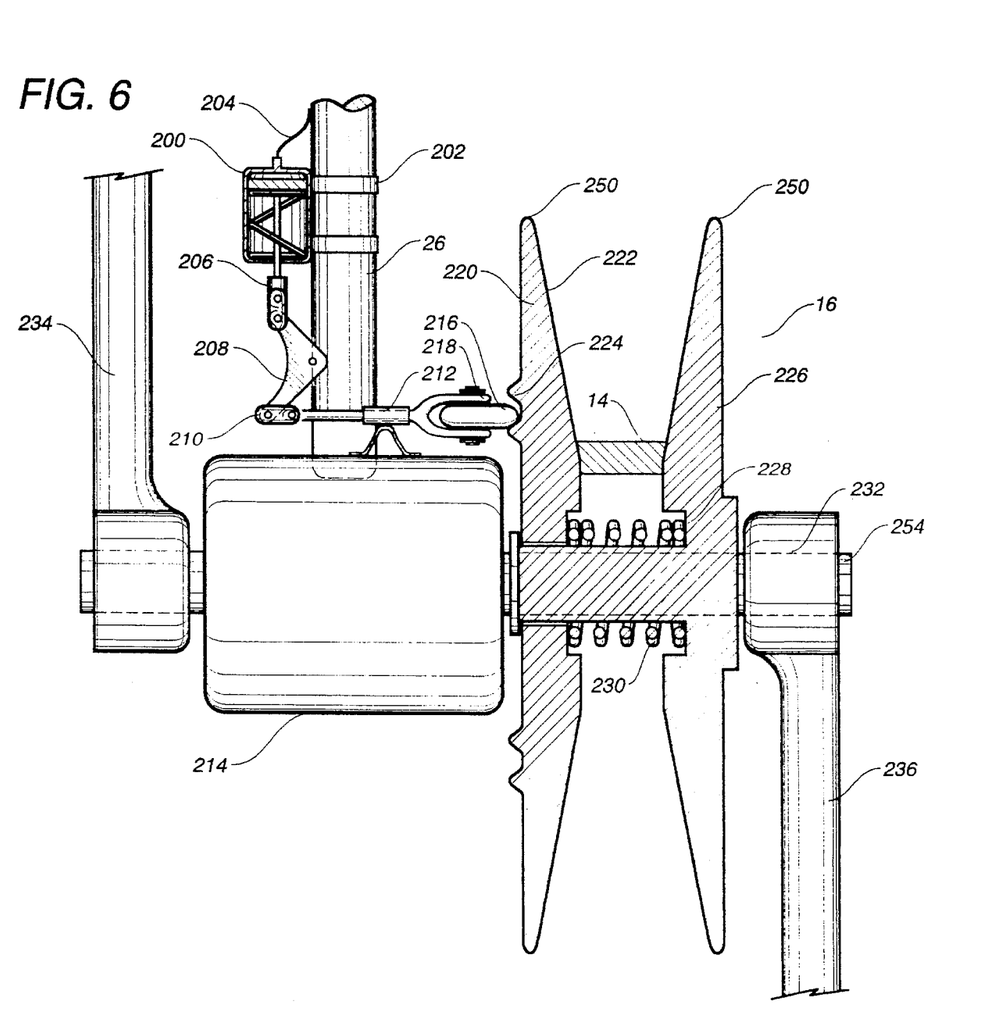
FIG. 6 is a cross-sectional end view of the first pulley as used on the pedals of the automatic transmission system of the present invention.

In the present invention, a related mechanism can be applied on the first pulley 16 so as to facilitate the changing of the gear ratios. However, as in conventional bicycles, the operation of the first pulley will be directly opposite the direction of the second pulley 18. As can be seen in FIG. 6, an actuator 200 is secured by a bracket 202 to the frame 26 of the bicycle. The actuator 200 has a similar configuration to that of the actuator 20. Conduit 204 can extend from the pump described herein previously. A piston arm 206 extends outwardly of the actuator 200. The piston arm 206 is connected at one end to a pivot arm 208. The pivot arm 208 is pivotally mounted to the frame 26. The other end of the pivot arm 208 is connected to an abutment arm 210. The abutment arm 210 is supported within a guide member 212 upon the bottom frame portion 214 of the bicycle. The abutment arm 210 is slidably received within the guide member 212. The abutment arm 210 has a clevis 216 at the end opposite the connection with the pivot arm 208. The clevis 216 supports a rotatable wheel 218 therein. The rotatable wheel 218 abuts a surface 220 of a first pulley half 222. As can be seen, the wheel 218 will reside within a pathway 224 formed on the surface 220.

The pulley 16 is made up of a first pulley half 222, a second pulley half 226, and a spindle 228. A spring 230 is mounted on the spindle 228 so as to resiliently urge the pulley halves 222 and 226 away from each other. It can be seen in FIG. 6 that the belt member 14 extends between the inner tapered surfaces of the pulley halves 222 and 226. The spindle 228 is supported upon an axle 232. The axle 232 is connected to pedals 234 and 236. Suitable bearings are provided, in a conventional fashion, so as to allow for the rotation of the pedals 234 and 236. The inner surface of the pedal 236 and the inner surface of the frame 214 will serve as limits to the movement of the pulley halves 222 and 226.

At a stop, or at slow speeds, the belt member 14 will reside in the position illustrated in FIG. 6. As such, the pumping of the pedals 234 and 236 will be easier. As speed increases, fluid pressure will be applied to the actuator 200 so as to cause the piston arm 206 to pivot the pivot arm 208 and cause the abutment arm 210 to urge the wheeled member 218 in pressurized contact against the surface 220 of the first pulley half 222. As such, the pulley halves 222 and 226 will be urged toward one another. This will cause the belt member 14 to move upwardly toward the outer diameter 250 of the first pulley 16. As such, a higher gear is achieved in the first pulley 16. This operates in conjunction with the operation of the second pulley 18 so as to facilitate the automatic transmission of the present invention.

Figure 7:
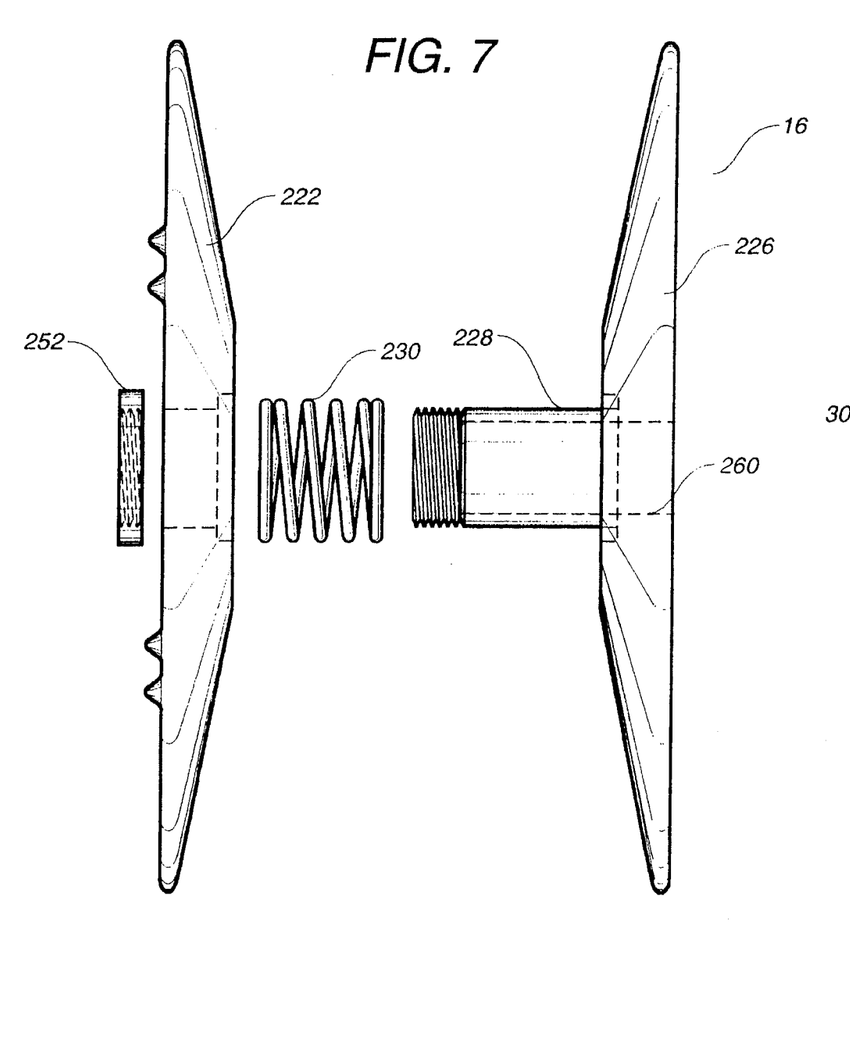
FIG. 7 is an exploded view of the first pulley of the present invention.

FIG. 7 illustrates how the first pulley half 222 is secured to the second pulley half 226 on the first pulley at 16. It can be seen that the spindle 228 extends from the second pulley half 226 and is received by a threaded member 252 on the opposite side of the first pulley half 222. The spring 230 extends over the outer surface of the spindle 228. In normal use, the ends of the spring 230 will be in abutment with the first pulley half 222 and with the second pulley half 226. The axle 254 of the pedals of the bicycle will extend through the interior passageway 260.

Figure 8:
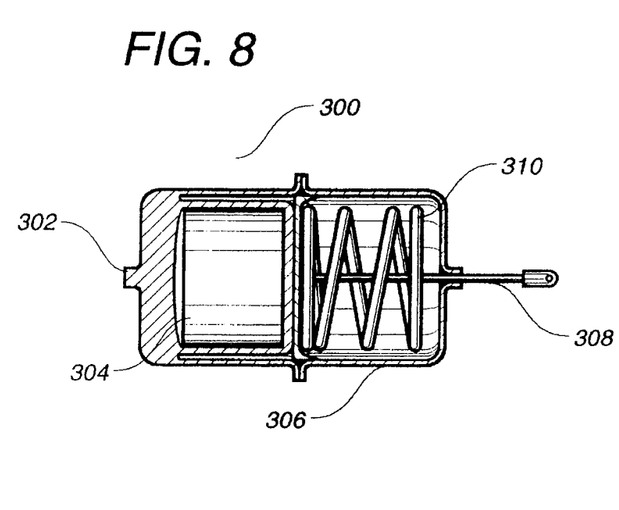
FIG. 8 is a close up cross-sectional view of an actuator of the present invention.

FIG. 8 is a more detailed illustration of an actuator 300. The actuator 300 is of a configuration that can be used for either of the actuators 20 or 200 of the present invention. In particular, the actuator 300 includes an input opening 302. A bellows mechanism 304 is provided on the interior of the actuator housing 306. As air is pumped into the interior of the actuator 300, the bellows 304 will expand so as to urge the piston arm 308 outwardly. Spring 310 will be resistive, to a desired degree, of this movement of the piston arm 308. The piston arm 308 includes a connector 312 at the end opposite the actuator 300.

The foregoing disclosure and description of the invention is illustrative and explanatory thereof. Various changes in the details of the structure of the present invention can be made within the scope of the appended claims without departing from the true spirit of the invention. The present invention should only be limited by the following claims and their legal equivalents.

I claim:

1. An automatic transmission system for a cycle comprising:

a belt member having a fixed width, said belt member extending from a first pulley connected to pedals of the cycle to a second pulley in driving connection to a wheel of the cycle, said second pulley having a belt-receiving slot of tapering width such that said slot is widest adjacent an outer diameter of said second pulley; and an actuator means contacting said belt member, said actuator means for applying a pressure to said belt member in relation to a rate of rotation of the wheel, said actuator means for causing said belt member to move radially in said belt-receiving slot, said actuator means comprising:

an actuator affixed to said cycle, said actuator being a pneumatic actuator having a pump driven by the wheel; and an arm member extending outwardly from said actuator, said arm member being in interactive contact with said belt member, said arm member comprising:

a piston arm extending outwardly from said actuator so as to move relative to the rate of rotation of the wheel; and a control arm pivotally connected at one end to a frame of the cycle and contacting the belt member at an opposite end.

2. The system of claim 1, said control arm having a freely rotatable roller in rolling contact with said belt member.

3. The system of Claim 1, said actuator means comprising:

a conduit extending from said pump to said actuator, said arm member longitudinally movable relative to a fluid pressure passing from said pump to said actuator.

4. The system of claim 3, said actuator having a bleed valve means affixed thereto, said bleed valve means for passing fluid from said actuator when the fluid pressure exceeds a predetermined level.

5. The system of claim 4, said actuator being a hydraulic actuator, said bleed valve means for passing hydraulic pressure in a closed loop to said pump.

6. The system of claim 4, further comprising:

a pressure control lever means connected to said bleed valve means for selectively choosing said predetermined level of fluid pressure.

7. The system of claim 1, said first pulley having an interior slot of tapering width, said belt member extending across said tapering width, said interior slot having a greatest width adjacent an outer diameter of said first pulley.

8. The system of claim 7, said second pulley comprising:

a first pulley half;

a second pulley half; and a spindle connecting said first pulley half to said second pulley half, said first pulley half being in resilient relationship to said second pulley half.

9. The system of claim 8, said first pulley further comprising:

a spring mounted on said spindle so as to urge said first and second pulley halves away from each other.

10. The system of claim 8, said actuator means further comprising:

an actuator affixed to a frame of the cycle; and an actuator arm means extending from said actuator and contacting one of said first and second pulley halves, said actuator arm means for urging said first and second pulley halves toward each other relative to the rate of rotation of the wheel.

11. The system of claim 10, said actuator arm means comprising:

a piston arm extending outwardly of said actuator;

a pivot arm connected at one end to said piston arm; and an abutment arm connected to said pivot arm, said abutment arm having an end in abutment with one of said first and second pulley halves.

12. The system of claim 11, said actuator arm means further comprising:

a guide member affixed to said frame and slidingly receiving said abutment arm therein, said abutment arm slidable through said guide member relative to a pivotable movement of said pivot arm.

13. The system of claim 13, said abutment arm comprising:

a wheel member rotatably mounted at said end of said abutment arm, said wheel member in rolling contact with a surface of one of said first and second pulley halves.

14. The system of claim 8, said spindle mounted on an axle between the pedals of the cycle, said spindle having stops to the relative movement between said first and second pulley halves.

15. The system of claim 1, said second pulley having a connector affixed thereto, said connector attached to a rear axle of the cycle.

16. An automatic transmission system for a cycle comprising:

a belt member having a fixed width, said belt member extending from a first pulley connected to pedals of the cycle to a second pulley in driving connection to a wheel of the cycle, said second pulley having a belt-receiving slot of tapering width such that said slot is widest adjacent an outer diameter of said second pulley, said second pulley comprising:

a first pulley half;

a second pulley half; and a spindle connecting said first pulley half to said second pulley half, said first pulley half being in resilient relationship to said second pulley half on said spindle, said belt member received between said first pulley half and said second pulley half; and an actuator means contracting said belt member, said actuator means for applying a pressure to said belt member in relation to a rate of rotation of the wheel, said actuator means for causing said belt member to move radially in said belt-receiving slot.

17. The system of claim 16, said second pulley further comprising:

a spring mounted on one of said first and second pulley halves so as to urge said first and second pulley halves toward each other, said belt member urging said first and second pulley halves away from one another as said belt moves radially inwardly of said second pulley.

18. An automatic transmission system for a cycle comprising:

a belt member having a fixed width, said belt member extending from a first pulley connected to pedals of the cycle to a second pulley in driving connection to a wheel of the cycle, said second pulley having a belt-receiving slot of tapering width such that said slot is widest adjacent an outer diameter of said second pulley, said second pulley having a ratcheting means affixed thereto, said ratcheting means for free-wheeling when no pressure is applied to the pedals; and an actuator means contacting said belt member, said actuator means for applying a pressure to said belt member in relation to a rate of rotation of the wheel, said actuator means for causing said belt member to move radially in said belt-receiving slot.

* * * * *